(12) United States Patent
Mattausch et al.

(10) Patent No.: US 7,561,743 B2
(45) Date of Patent: Jul. 14, 2009

(54) REFERENCE DATA RECOGNITION AND LEARNING METHOD AND PATTERN RECOGNITION SYSTEM

(75) Inventors: Hans Jurgen Mattausch, Higashihiroshima (JP); Tetsushi Koide, Higashihiroshima (JP); Masahiro Mizokami, Higashihiroshima (JP)

(73) Assignee: Hiroshima University, Higashihiroshima-shi (JP)

( * ) Notice: Subject to any disclaimer, the term of this patent is extended or adjusted under 35 U.S.C. 154(b) by 896 days.

(21) Appl. No.: 11/015,038

(22) Filed: Dec. 20, 2004

(65) Prior Publication Data

US 2005/0154726 A1 Jul. 14, 2005

(30) Foreign Application Priority Data

Dec. 26, 2003 (JP) ............................. 2003-434596

(51) Int. Cl.
*G06K 9/62* (2006.01)
*G06K 9/54* (2006.01)
*G06F 17/30* (2006.01)

(52) U.S. Cl. ............................. 382/209; 382/305; 707/7
(58) Field of Classification Search ................. 382/159, 382/181, 209, 305, 218; 707/1–10
See application file for complete search history.

(56) References Cited

U.S. PATENT DOCUMENTS 6,378,042 B1 * 4/2002 Henderson et al. .......... 711/128

6,745,280 B2 * 6/2004 Darnell et al. .............. 711/108
7,069,388 B1 * 6/2006 Greenfield et al. .......... 711/133

FOREIGN PATENT DOCUMENTS

| EP | 1 158 460 A2 | 11/2001 |
| JP | 6-203075 | 7/1994 |
| JP | 2002-288985 | 10/2002 |
| JP | 2004-5825 | 1/2004 |

(Continued)

OTHER PUBLICATIONS

Farnaz Mounes-Toussi, et al., "The Effect of Using State-Based Priority Information in a Shared-Memory Multiprocessor Cache Replacement Policy", Parallel Processing, IEEE Comput. Soc., XP-010298394, Aug. 10, 1998, pp. 217-224.

(Continued)

*Primary Examiner*—Daniel G Mariam
(74) *Attorney, Agent, or Firm*—Oblon, Spivak, McClelland, Maier & Neustadt, P.C.

(57) ABSTRACT

In an associative memory, when a reference data having the minimum distance with respect to an input data is detected as winner, it is determined whether or not a distance between the input data and winner is less than a threshold value. If the distance is less than the threshold value, it is determined that the reference data detected as winner matches with the input data, and then, a rank of the reference data is improved. If the distance is more than the threshold value, it is determined that the reference data is data different from the input data, and then, the input data is written as new reference data to the associative memory and replaces the reference data with the lowest rank. The upper positions of rank form as a long-term memory, and the lower positions thereof form as a short-term memory.

10 Claims, 17 Drawing Sheets

FOREIGN PATENT DOCUMENTS

| | | |
|---|---|---|
| JP | 2004-13504 | 1/2004 |
| TW | 302448 | 4/1997 |
| TW | 559739 | 11/2003 |

OTHER PUBLICATIONS

Zhe Xiang, et al., "Cost-Based Replacement Policy for Multimedia Proxy across Wireless Internet", IEEE Global Telecommunications Conference, vol. 3, XP-001054923, Nov. 25, 2001, pp. 2009-2013.

Chi-Chun Lo, et al., "Second Chance Replacement Policy for Mobile Database Overflow", IEEE Global Telecommunications Conference, vol. 1, XP-010636430, Nov. 17, 2002, pp. 1683-1687.

Tetsushi Koide, et al., "Associative Memory-Based Systems With Recognition and Learning Capability", Proceedings of First Hiroshima International Workshop of Nanoelectronics for Terra-Bit Information Processing, 'Online!, XP-002327564, Mar. 17, 2003, pp. 123-128.

A. S. Tanenbaunm, "Modern Operating Systems, Passage", Modern Operating Systems, XP-002297574, 2001, pp. 132-153, 202-237.

Paul Berube, et al., "The Bank Nth Chance Replacement Policy for FPGA-Based CAMs", 13$^{th}$ International Conference on Field Programmable Logic and Applications (FPL), 'Online!, XP-002327699, Sep. 2003, 10 pages.

Iwata and Y. Amemiya, "Neural network LSI", Denshi Joho Tsuushin Gakkai, 1995, pp. 34-63.

Hans Jurgen Mattausch, et al., "Compact Associative-Memory Architecture With Fully Parallel Search Capability for the Minimum Hamming Distance", IEEE Journal of Solid-State Circuits, vol. 37, No. 2, Feb. 2002, pp. 218-227.

Hans Jurgen Mattausch, et al., "Fully-Parallel Pattern-Matching Engine with Dynamic Adaptability to Hamming or Manhattan Distance", 2002 Symposiums on VLSI Circuits Digest of Technical Papers, 2002, pp. 252-255.

Hans Jurgen Mattausch, et al., "An Architecture for Compact Associative Memories with Deca-ns Nearest-Match Capability up to Large Distances", ISSCC Digest of Tech. Papers, 2001IEEE Journal of Solid-State Circuits Conference, 2001, pp. 170-171.

\* cited by examiner

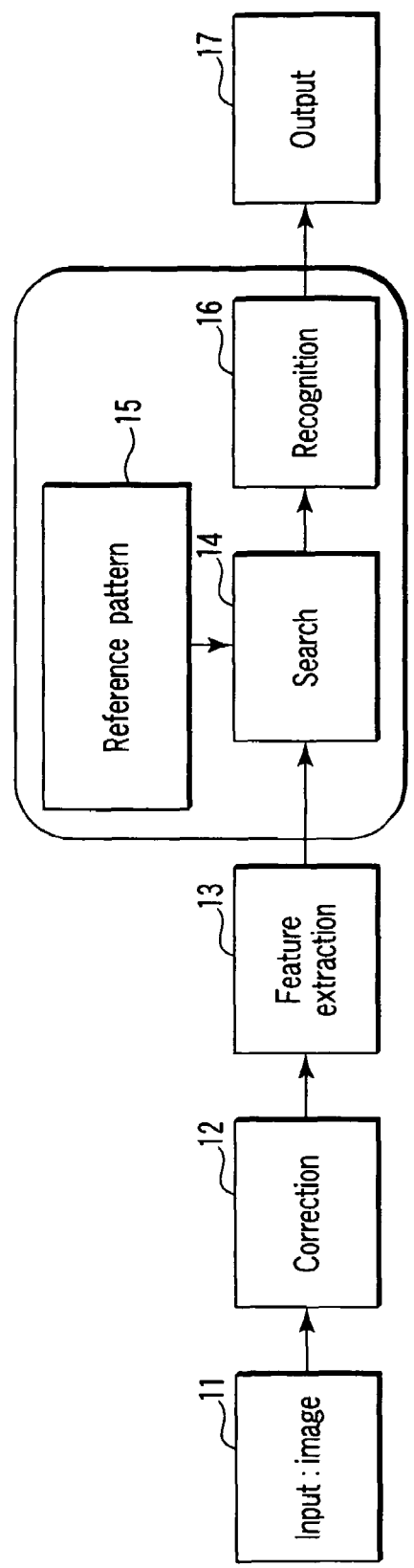
F I G. 1

| rank | |
|---|---|
| 1 | Reference data 1 |
| ⋮ | ⋮ |
| 39 | Reference data 39 |
| 40 | Reference data 40 |
| 41 | Reference data 41 |
| 42 | Reference data 42 |
| ⋮ | ⋮ |
| 63 | Reference data 63 |
| 64 | Reference data 64 |

Long-term memory: ranks 1–40
Short-term memory: ranks 41–64

FIG. 5

Before process

| rank | |
|---|---|
| 1 | Reference data 1 |
| ⋮ | ⋮ |
| 34 | Reference data 34 |
| 35 | Reference data 35 |
| 36 | Reference data 36 |
| 37 | Reference data 37 |
| 38 | Reference data 38 |
| 39 | Reference data 39 |
| 40 | Reference data 40 |
| 41 | Reference data 41 |
| ⋮ | ⋮ |
| 64 | Reference data 64 |

$J_L = 5$

After process

| rank | |
|---|---|
| 1 | Reference data 1 |
| ⋮ | ⋮ |
| 34 | Reference data 39 |
| 35 | Reference data 34 |
| 36 | Reference data 35 |
| 37 | Reference data 36 |
| 38 | Reference data 37 |
| 39 | Reference data 38 |
| 40 | Reference data 40 |
| 41 | Reference data 41 |
| ⋮ | ⋮ |
| 64 | Reference data 64 |

Before process

| rank | |
|---|---|
| 1 | Reference data 1 |
| ⋮ | ⋮ |
| 40 | Reference data 40 |
| 41 | Reference data 41 |
| ⋮ | ⋮ |
| 60 | Reference data 60 |
| 61 | Reference data 61 |
| 62 | Reference data 62 |
| 63 | Reference data 63 |
| 64 | Reference data 64 |

$J_S=3$

After process

| rank | |
|---|---|
| 1 | Reference data 1 |
| ⋮ | ⋮ |
| 40 | Reference data 40 |
| 41 | Reference data 41 |
| ⋮ | ⋮ |
| 60 | Reference data 63 |
| 61 | Reference data 60 |
| 62 | Reference data 61 |
| 63 | Reference data 62 |
| 64 | Reference data 64 |

FIG. 6C

Before process

| rank | |
|---|---|
| 1 | Reference data 1 |
| ⋮ | ⋮ |
| 40 | Reference data 40 |
| 41 | Reference data 41 |
| 42 | Reference data 42 |
| 43 | Reference data 43 |
| ⋮ | ⋮ |
| 62 | Reference data 62 |
| 63 | Reference data 63 |
| 64 | Reference data 64 |

→ delete

After process

| rank | |
|---|---|
| 1 | Reference data 1 |
| ⋮ | ⋮ |
| 40 | Reference data 40 |
| 41 | Search data |
| 42 | Reference data 41 |
| 43 | Reference data 42 |
| ⋮ | ⋮ |
| 62 | Reference data 61 |
| 63 | Reference data 62 |
| 64 | Reference data 63 |

FIG. 8C

Before process

| rank | |
|---|---|
| 1 | Reference data 1 |
| 2 | Reference data 2 |
| 3 | Reference data 3 |
| ⋮ | ⋮ |
| 38 | Reference data 38 |
| 39 | Reference data 39 |
| 40 | Reference data 40 |
| 41 | Reference data 41 |
| ⋮ | ⋮ |
| 64 | Reference data 64 |

After process

| rank | |
|---|---|
| 1 | Reference data 39 |
| 2 | Reference data 1 |
| 3 | Reference data 2 |
| ⋮ | ⋮ |
| 38 | Reference data 37 |
| 39 | Reference data 38 |
| 40 | Reference data 40 |
| 41 | Reference data 41 |
| ⋮ | ⋮ |
| 64 | Reference data 64 |

FIG. 8D

Before process

| rank | |
|---|---|
| 1 | Reference data 1 |
| ⋮ | ⋮ |
| 40 | Reference data 40 |
| 41 | Reference data 41 |
| 42 | Reference data 42 |
| 43 | Reference data 43 |
| ⋮ | ⋮ |
| 62 | Reference data 62 |
| 63 | Reference data 63 |
| 64 | Reference data 64 |

After process

| rank | |
|---|---|
| 1 | Reference data 1 |
| ⋮ | ⋮ |
| 40 | Reference data 40 |
| 41 | Search data |
| 42 | Reference data 41 |
| 43 | Reference data 42 |
| ⋮ | ⋮ |
| 62 | Reference data 61 |
| 63 | Reference data 62 |
| 64 | Reference data 63 |

→ delete

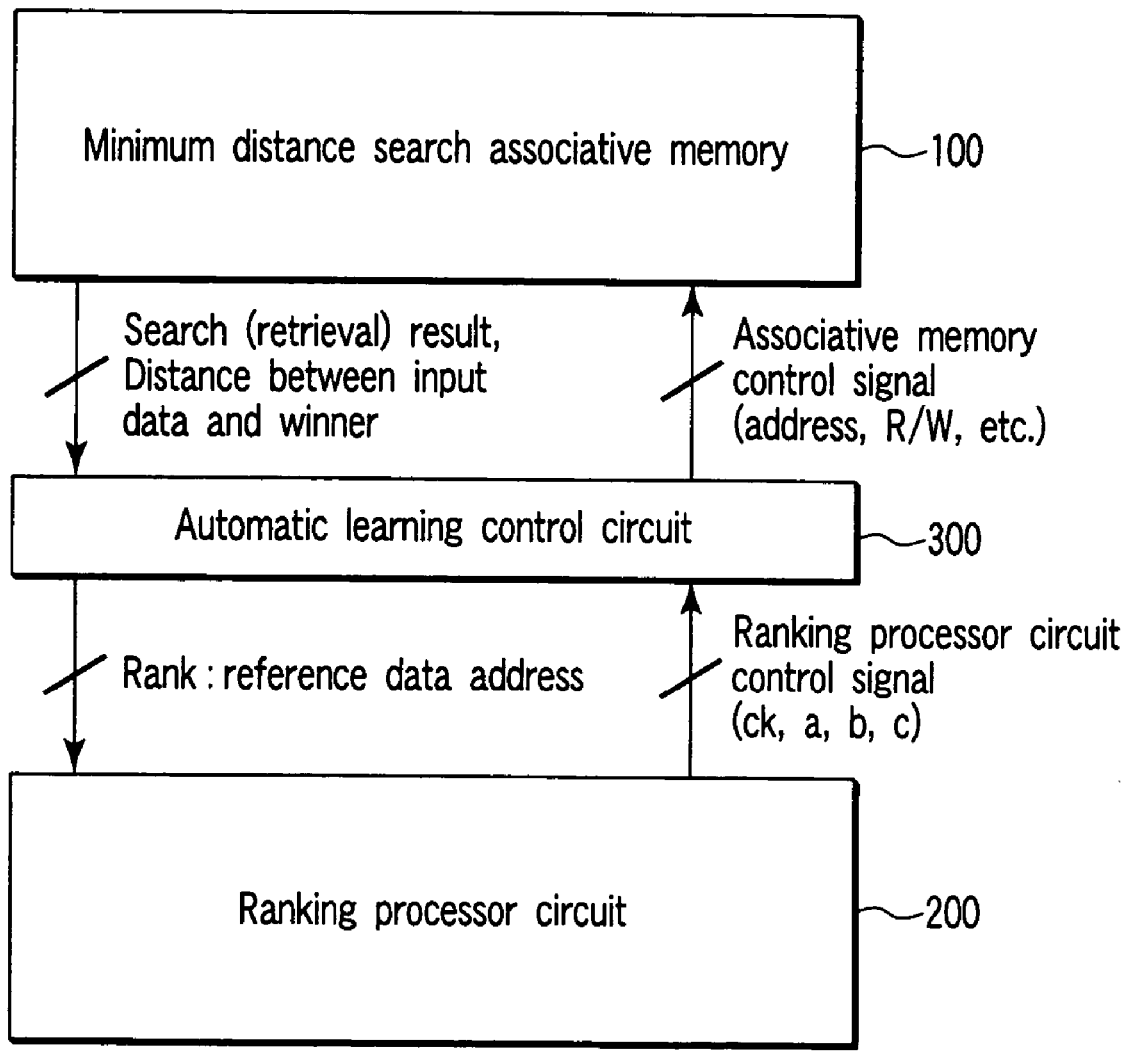
F I G. 13

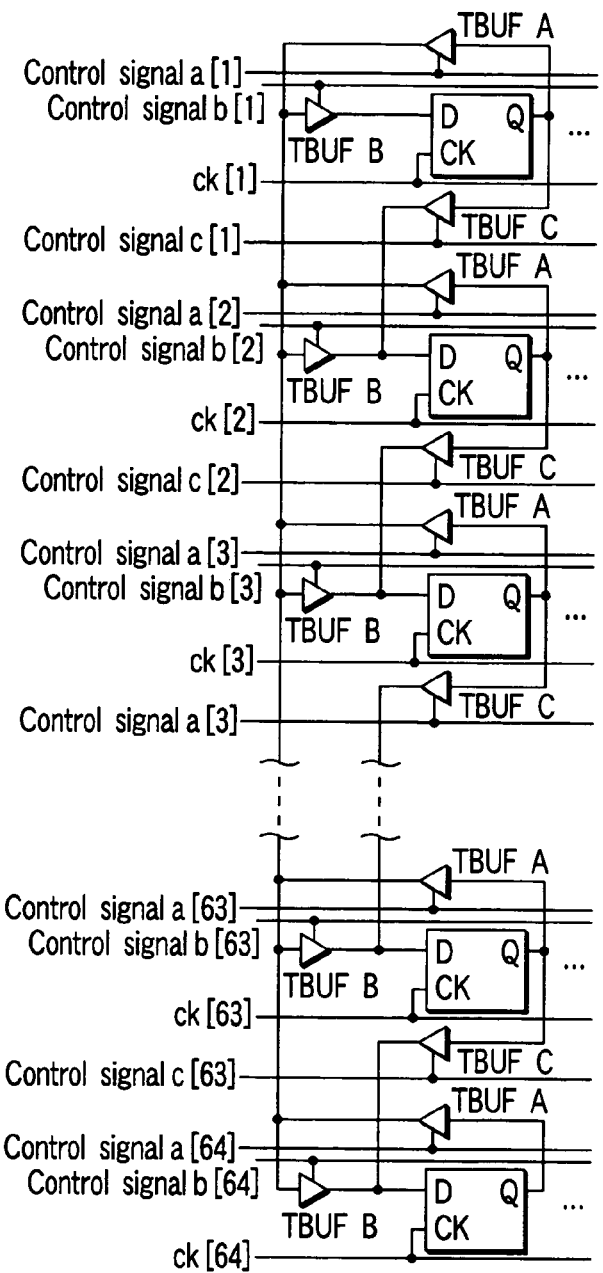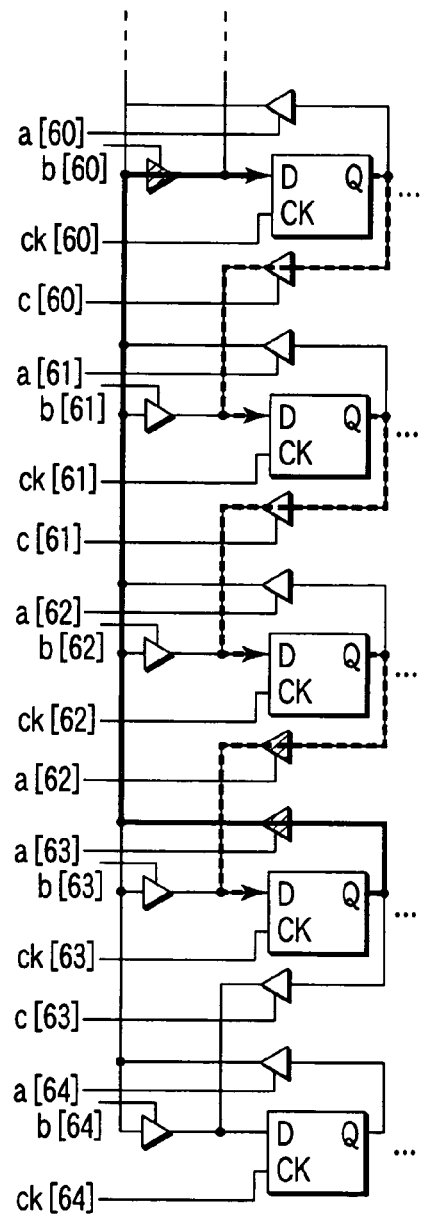
F I G. 14A
F I G. 14B

Features of test chip

| | |
|---|---|
| Minimum distance index data length | Manhattan distance (5-bit × 16) |
| Number of reference patterns<br>Number of short-term memory patterns<br>Number of long-term memory patterns | 64<br>24 (default, variable)<br>40 (default, variable) |
| Searchable range | 0 to 496 distances |
| Process technique | 0.35 μm, 2-poly, 3 metal, CMOS,<br>4.9-mm square package |
| Supply voltage | 3.3V |
| Number of transistors | 402,768 |
| Area of Layout<br>Associative memory section<br>Automatic learning circuit section | 11.04mm²<br>6.2mm² (3.1mm × 2mm)<br>484mm² (3.4mm × 1.3mm + 0.2mm × 2.1mm) |
| Search time | <250nsec (simulation) |
| Automatic learning circuit maximum operation frequency | 166MHz<br>(gate level simulation) |

F I G. 18

REFERENCE DATA RECOGNITION AND LEARNING METHOD AND PATTERN RECOGNITION SYSTEM

CROSS-REFERENCE TO RELATED APPLICATIONS

This application is based upon and claims the benefit of priority from prior Japanese Patent Application No. 2003-434596, filed Dec. 26, 2003, the entire contents of which are incorporated herein by reference.

BACKGROUND OF THE INVENTION

1. Field of the Invention

The present invention relates to a reference data recognition learning method of making reference data recognition learning with respect to an associative memory, which compares input pattern search data with several reference data to select and output the most similar data. Further, the present invention relates to a pattern recognition system for carrying out the reference data recognition learning using the foregoing method.

2. Description of the Related Art

In a pattern recognition system, pattern matching is a significant element in a recognition process. A model realized using a processor as a base is the most general in a conventional system. The model employs the method of sequentially comparing input pattern data with several reference data stored in memory to detect the most similar reference data. However, the method employed in the model has the following problems. Sequential comparison is required; for this reason, much processing time is taken. In addition, the processing time increases in proportion to the increase of the number of comparison data. The reference data is sequentially compared; for this reason, no learning concept exists in replacement of comparison sequence and registration of novel reference data. As a result, the effect of shortening the process time by learning is not obtained.

Pattern recognition and learning is a function indispensable to build up an artificial intelligence system having the same capability as the human brain. For this reason, it is technically very important to realize the foregoing function using integrated circuits. A neural network is used in most of the methods proposed so far in order to realize pattern recognition and learning function (for example, see Document 1). However, according to the method of using the neural network, there is no preferable method of effectively storing patterns. For this reason, pattern information must be captured in the network structure. In order to make the network learn to make new pattern recognition after network learning is already completed, relearning is newly required in the whole of the network. Thus, learning while making recognition process is difficult. Recently, the development of the method of realizing recognition function by hardware using the neural network is later than initially expected. For these reasons in the point of view of integration and power dissipation realizing neural a neural network LSI is difficult. For this reason, it is desired to provide a method of realizing the recognition function by excellent and new hardware effectively combining memory elements.

Considering the circumstances described above, the research and development of a compact and high-speed associative memory with fully parallel architecture (e.g., Documents 2 to 7) have been recently made. It is proposed to use the foregoing associative memory for pattern matching. The associative memory has the minimum distance search function, which is a significant element to realize the recognition function. The associative memory is capable of making a comparison between search data and each reference data using analog-digital hybrid and fully parallel processing. Thus, the associative memory has attracted special interest because it is expected to realize high-speed pattern matching.

However, in the pattern recognition system using the foregoing associative memory as a base, an effective learning method of recognizing new reference data is not established. For this reason, considerable time is taken to add or replace the reference data.

Reference Documents:

[Document 1] Iwata and Y. Amemiya, "Neural network LSI", Denshi Joho Tsuushin Gakkai, 1995.

[Document 2] H. J. Mattausch, et al. "Compact associative-memory architecture with fully-parallel search capability for the minimum Hamming distance", IEEE Journal of Solid-State Circuits, vol. 37, pp. 218-227, 2002.

[Document 3] H. J. Mattausch, et al. "Fully-parallel pattern-matching engine with dynamic adaptability to Hamming or Manhattan distance", 2002 Symposiums on VLSI circuit Dig of Tech. Papers, pp. 252-255, 2002.

[Document 4] H. J. Mattausch, et al. "An architecture for compact Associative Memories with Deca-ns Nearest-Match Capability up to Large Distance", ISSCC Dig of Tech. Papers, pp. 170-171, 2001.

[Document 5] JPN. PAT. APPLN. No. 2002-008783 (JPN. PAT. APPLN. KOAKI Publication No. 2002-288985)

[Document 6] JPN. PAT. APPLN. No. 2002-159436 (JPN. PAT. APPLN. KOAKI Publication No. 2004-005825)

[Document 7] JPN. PAT. APPLN. No. 2002-165769 (JPN. PAT. APPLN. KOAKI Publication No. 2004-013504)

BRIEF SUMMARY OF THE INVENTION

As described above, the learning method to recognize newly added reference data is not established in the conventional pattern recognition system using the associative memory to achieve high-speed matching. For this reason, considerable time is taken to learn reference data recognition.

An object of the present invention is to provide a reference data recognition learning method, which can automatically learn new reference data recognition indispensable to pattern matching for a relatively short time. Another object of the present invention is to provide a pattern recognition system, which can shorten time spent for pattern recognition using the foregoing method.

According to an aspect of the invention, there is provided a reference data recognition learning method of realizing reference data recognition and learning with respect to an associative memory, which compares input search data with several reference data to select and output the most similar reference data, comprising:

a rank giving step of giving a rank corresponding to a priority to several reference data stored in the associative memory;

a selecting step of comparing the search data with the several reference data every time when the search data is input to detect a similarity, and selecting a reference data having the highest similarity;

an identity determining steps of determining whether or not the search data and the reference data selected by the selecting step are identical to each other from their similarity; and a rank control step of improving a rank of the corresponding reference data by a predetermined number while putting back a rank of other reference data when it is determined that both data are identical in the identity determining step, and registering the search data to a predetermined rank of the reference data while putting back a rank of other reference data equal or lower than the rank when it is determined that both data are not identical identity in the identity determining step.

According to another aspect of the invention, there is provided a pattern recognition system for selecting a reference data, which is the most similar to a search data of an input pattern, from several reference data to recognize the input pattern, comprising:

an associative memory including: at least reference data memory means for storing several reference data for recognizing the search data of the input pattern; minimum distance search means for searching a reference data having the minimum distance with respect to the search data from the several reference data; and identity determining means for determining the identity of the search data and the reference data having the minimum distance in accordance with the result whether or not the minimum distance is more than a threshold value;

rank control means for managing several reference data stored in the associative memory to give a rank corresponding to the priority to each reference data; and learning control means for controlling the rank control means so that the rank control means improves a rank of the recognized reference data while puts back a rank of other reference data when the identity determining means determines that the search data and the reference data are identical, and controlling the associative memory and the rank control means so that the associative memory stores the corresponding search data as new reference data and so that the rank control means sets a rank of the new reference data to an initial value while putting back a rank of other reference data equal or less than the preset rank when it is determined that the search data and the reference data are not identical.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of an image recognition system given as one example of an associative-memory-based pattern recognition system to which a method according to the present invention is applied;

FIG. 5 is a view to explain short-term memory and long-term memory of the recognition learning algorithm 1 shown in FIG. 4;

FIGS. 6A, 6B and 6C are views showing a state of ranking according to the recognition learning algorithm 1 shown in FIG. 4;

FIGS. 8A, 8B, 8C and 8D are views showing a state of ranking according to the recognition learning algorithm 2 shown in FIG. 7;

FIG. 13 is a block diagram schematically showing the configuration of an architecture for realizing associative-memory-based recognition learning algorithm according to the present invention;

FIGS. 14A and 14B are block diagrams showing the configuration of hardware for realizing the architecture of a ranking circuit shown in FIG. 13;

FIG. 18 is a list showing various features of the test chip.

DETAILED DESCRIPTION OF THE INVENTION

Figure 2:
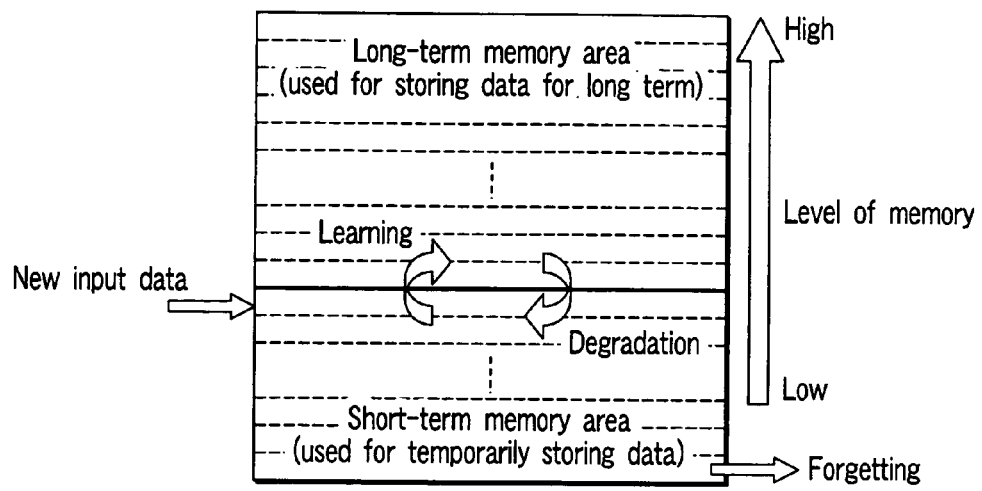
FIG. 2 is a view to the concept showing a state of realizing a learning function based on short-term memory and long-term memory in the present invention.

The present invention relates to a reference data recognition learning method and a pattern recognition system based on the foregoing method. According to the foregoing method and system, an associative memory is used to search (retrieve) the minimum distance with retrieval data given to each of several reference data. The associative memory compares the similarity of the search data with respect to the minimum distance data ("winner"). Thereafter, the associative memory determines whether or not the search data is regarded as being identical. If it is determined that the search data is different, the search data is recognized and learnt as new reference data (data overwrite is carried out with respect already existing reference data). On the other hand, if the reference data is recognized as being the identical, the reference data is far from the overwrite target in search data learning, and then, stored for a longer period. As seen from the foregoing explanation, the associative memory has a function of automatically learning new search data and frequently used reference data.

A so-called "supervised" learning neural network externally has the peculiar problem relevant to learning speed. However, according to the associative-memory-based method, data to be learnt is merely written in memory. In other words, even if human does not teach correct output with respect to input, unlike the "unsupervised learning", it is possible to automatically learn frequently given data. Thus, the foregoing "unsupervised learning" is possible. New data is learnt while any data must be deleted from already stored data. However, sufficiently learnt data is preferentially stored without being deleted (canceled) for a long time. Thus, the present invention employs an algorithm imitating the human memory model such as short-term memory and long-term memory.

The best mode for carrying out the present invention will be described below with reference to the accompanying drawings.

FIG. 1 is a block diagram showing the configuration of an image recognition system given as one example of an associative-memory-based pattern recognition system to which a method according to the present invention is applied.

In the image recognition system, an image input section 11 captures an image, and a correction processing section 12 removes noise component. Thereafter, a feature extraction section 13 extracts a feature pattern of the input image. A search section 14 searches the most similar pattern to the feature pattern (input data) from several reference patterns (reference data) previously registered in a database 15. If the corresponding reference pattern is searched, a recognition section 16 recognizes that the input image is a known image having reference pattern, and sends the result to an output section 17 such as a display device.

In the foregoing system, search section 14, database 15 and recognition section 16 are realized using an associative memory A. The associative memory A has a normal RAM function of writing data to the given address and reading the address data. In addition to the function, the associative memory A has a function of searching the most similar data (having minimum distance) to the given data from memory.

In the system configuration, learning algorithm for search is indispensable in order to improve recognition efficiency. In particular, the search is made; as a result, if there exists no similar reference pattern, it is necessary to register a new reference pattern, and to learn recognition of the new reference pattern.

The recognition learning algorithm proposed by the present invention realizes learning in the following manner. More specifically, data, which does not exist in reference data (template) of the associative memory, is temporarily stored in a short-term memory area while frequently given data is stored in a long-term memory area. In brief, the recognition learning algorithm is based on the concept of short-term and long-term memories of the human brain. FIG. 2 shows a state of realizing a learning function based on short-term and long-term memories. In FIG. 2, the vertical axis (ordinate) shows a degree of memory, and the upper side is a long-term memory area (used for storing data for a long term) while the lower side is a short-term memory area (used for temporary memory). When a new input data is given, the input data is registered to the most significant rank of the short-term memory area. Then, the new input data is registered to the long-term memory area by learning effect in accordance with the number of matching with search data. When the new data is input and registered, the least significant rank data is forgotten (abandoned).

The outline of recognition learning when a minimum distance search associative memory is applied to the recognition system will be explained below with reference to FIG. 3A to FIG. 3C.

Figure 3A:
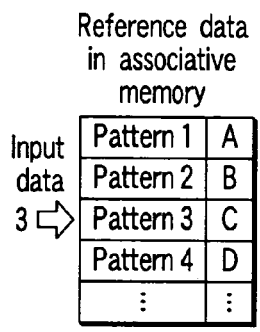
FIGS. 3A, 3B and 3C are views to explain the outline of recognition learning when applying a minimum distance search associative memory to a recognition system in the present invention.
Figure 3B:
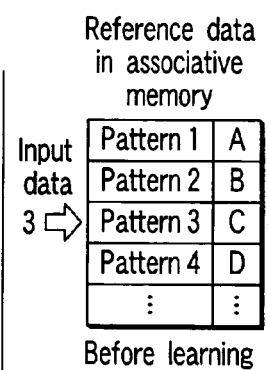
Figure 3C:
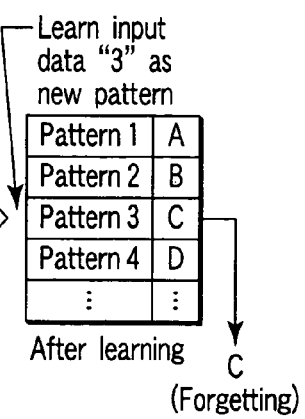

FIG. 3A shows the recognition result when no reference data exists in memory, and FIG. 3B shows the recognition result when reference data is newly registered by learning.

The minimum distance search associative memory is applied to the recognition system. In this case, if no reference data corresponding to input (search) data exists in memory, the associative memory detects data having the minimum distance as winner. For example, as shown in FIG. 3A, "3" is input as input data to the associative memory, which stores character data "A", "B", "C" and "D" as reference data. In this case, simply judging from the minimum distance search result only, the input data "3" is recognized as "B". However, the distance between "3" and "B" has actually far relation; for this reason, "3" and "B" should be treated as different data.

According to the present invention, the following learning is carried out. More specifically, the distance between the input data and the winner (input data-winner distance) is calculated, and thereafter, the calculated distance is compared with a threshold value. If the distance is less than the threshold value, it is determined as matching. On the other hand, if the distance is more than the threshold value, it is determined as unmatching. Priority is given to each reference data stored in the associative memory, and the input data regarded as unmatching is newly stored as reference data in place of reference data having low priority. If the input data is regarded as matching, the priority of the corresponding reference data is improved. For example, as seen from FIG. 3B (before learning) and FIG. 3C (after learning), the input data "3" regarded as unmatching is newly stored as reference data in place of the reference data "C" having low priority. The priority of the reference data is improved every when the input data "3" is regarded as matching. The learning described above is carried out, and thereby, when the data "3" is input next, the input data "3" is correctly distinguished as "3".

As described before, the learning method (hereinafter, referred to as learning algorithm) of the present invention has the following features. Data, which does not exists in reference data (equivalent to database) of the associative memory, is temporarily stored, and frequently given data is learned. By doing so, processing equivalent to short-term and long-term memories of the human brain is realized. Learning algorithm by the memory-based architecture enables write-once learning at which the neural network is poor.

In general, it is difficult that the sufficiently trained neural network makes write-once learning with respect to only new data. Because, teacher data is given to a network for remembering previously learned data, and thereafter, there is a need of making recorrection on learning from the beginning. As described above, the foregoing learning requires the teacher data. Conversely, according to the memory-based learning method, learning is possible if only new data is written to memory. Thus, according to the learning algorithm of the present invention, it is possible to automatically learn data having high frequency without requiring teacher data. As a result, many intelligent applications are possible. Here, three kinds of recognition learning algorithms using the associative memory are proposed.

(Recognition Learning Algorithm 1)

Figure 4:
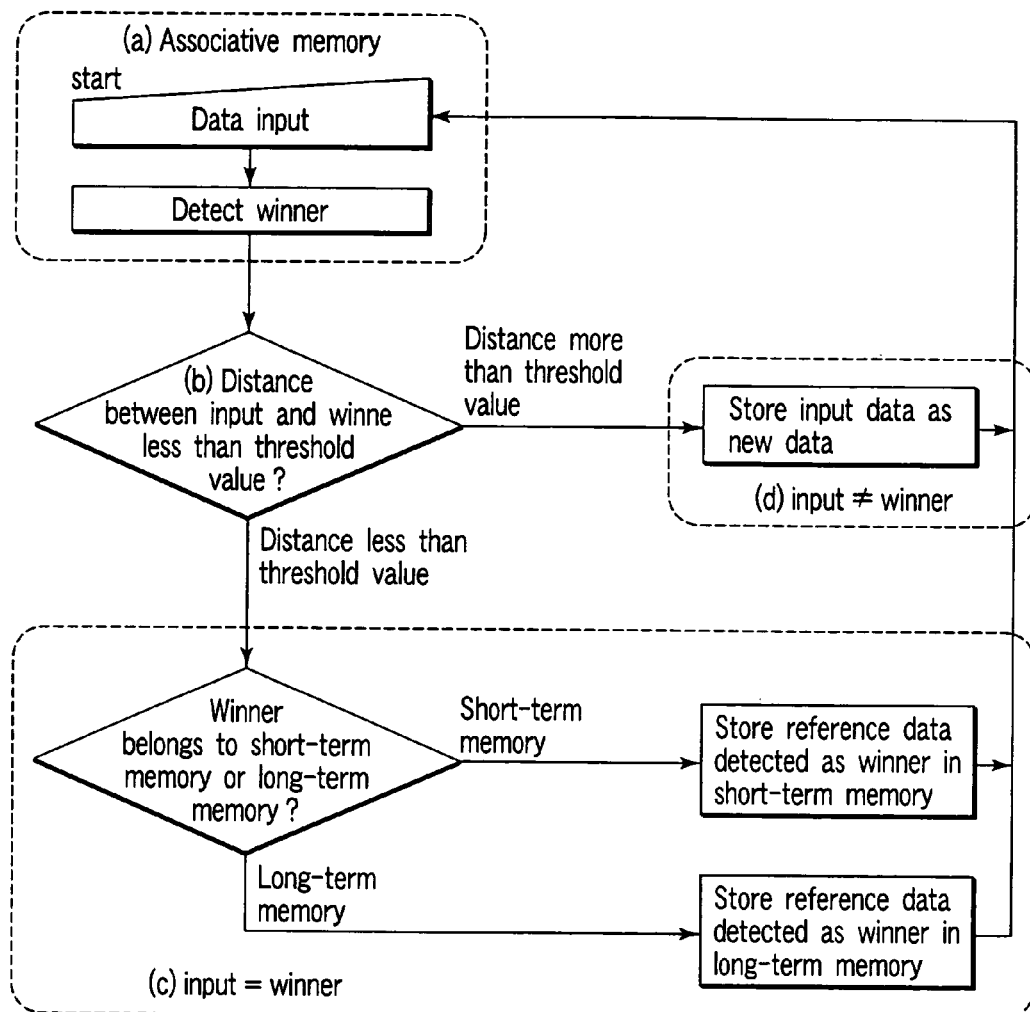
FIG. 4 is a flowchart to explain the procedure of a recognition learning algorithm 1 according to the present invention.

FIG. 4 is a flowchart to explain the procedure of a recognition learning algorithm 1 according to the present invention.

As seen from FIG. 4, in a process (a), when data is input, a distance (e.g., Hamming distance, Manhattan distance, Euclidian distance) between input data and each reference data is calculated. The reference data having the minimum distance is detected as winner.

In a process (b), a distance D between input data and winner is evaluated, and thereafter, it is determined whether the distance D is less or more than the threshold value.

In a process (c), if the distance D between input data and winner is less than the threshold value, the reference data detected as winner is regarded as matching with the input data. Then, the rank showing the priority of the reference data is improved. In this case, the upper position of the rank is preset as long-term memory ($N_L$); on the other hand, the lower position of the rank is preset as short-term memory ($N_S$). The improvement width of the rank of the reference data detected as winner is $J_S$ in the short-term memory while being $J_L$ in the long-term memory ($J_S < J_L$).

In a process (d), if the distance D between input data and winner is more than the threshold value, the reference data detected as winner is regarded as being data different from the input data. Then, the input data is written as new reference data to the associative memory. In this case, the input data newly learned as reference data is stored as the uppermost position of the rank of the short-term memory. The rank of other reference data of the short-term memory is reduced. As a result, the reference data of the lowermost position before learning is deleted (input data is overwritten to the address in the associative memory).

Short-term memory and long-term memory of the recognition learning algorithm 1 will be explained below with reference to FIG. 5.

FIG. 5 shows a state of giving a rank to reference data stored in the associative memory. Here, the associative memory has the reference data maximum memory number=64. In the associative memory, upper ranks 1 to 40 are stored as reference data of the long-term memory while lower ranks 41 to 64 are stored as reference data of the short-term memory.

The short-term memory means a temporarily treated memory of forgetting data already stored every when new data is learned. Conversely, the long-term memory means that memory is continued for a relatively long term without receiving the influence when new data is learned, unlike the short-term memory.

FIG. 6A and FIG. 6B show the case of the process (c) in the foregoing recognition learning algorithm 1. More specifically, reference data ranked in FIG. 5 are stored in the associative memory, and the minimum distance search by the associative memory is made. As a result, the distance D between input (search) data and winner is less than the threshold value. FIG. 6C shows the case of the process (d) in the foregoing recognition learning algorithm 1. More specifically, reference data ranked in FIG. 5 are stored in the associative memory, and the minimum distance search by the associative memory is made. As a result, the distance D between input (search) data and winner is more than the threshold value.

As illustrated in FIG. 6A, when reference data 39 is winner, the rank 39 belongs to the long-term memory. The rank of the winner (reference data 39) is improved by $J_L$ ($J_L$=5); therefore, it is set as rank 34. In this case, reference data ranking equal or lower than the old rank 34 is successively put back. As a result, reference data is ranks 34 to 39 are changed.

As depicted in FIG. 6B, when reference data 63 is winner, the rank 63 belongs to the short-term memory. The rank of the winner (reference data 63) is improved by $J_S$ ($J_S$=3); therefore, it is set as rank 60. In this case, reference data ranking equal or lower than the old rank 60 is successively put back. As a result, reference data with ranks 60 to 63 are changed.

As seen from FIG. 6C, when the distance between input data and winner is more than the threshold value, the reference data detected as winner is regarded as being data different from the input data. Then, the input data is written as new reference data to the associative memory. In this case, the input data newly learned as reference data is stored in the uppermost rank 41 of the short-term memory. Thus, the rank of other reference data of the short-term memory is put back. As a result, the reference data of the lowermost position before learning is deleted (input data is overwritten to the address in the associative memory).

According to the recognition learning algorithm 1, the memory of the reference data becomes strong every when recognition is made (i.e., rank is improved). On the other hand, the memory of the reference data having no recognition becomes weak (rank is reduced). As a result, the following operation is realized; more specifically, frequently used data is hard to be forgotten while almost no used data is forgotten. Therefore, it is possible to enhance recognition efficiency, and to effectively use hardware resource having limited memory capacity.

(Recognition Learning Algorithm 2)

Figure 7:
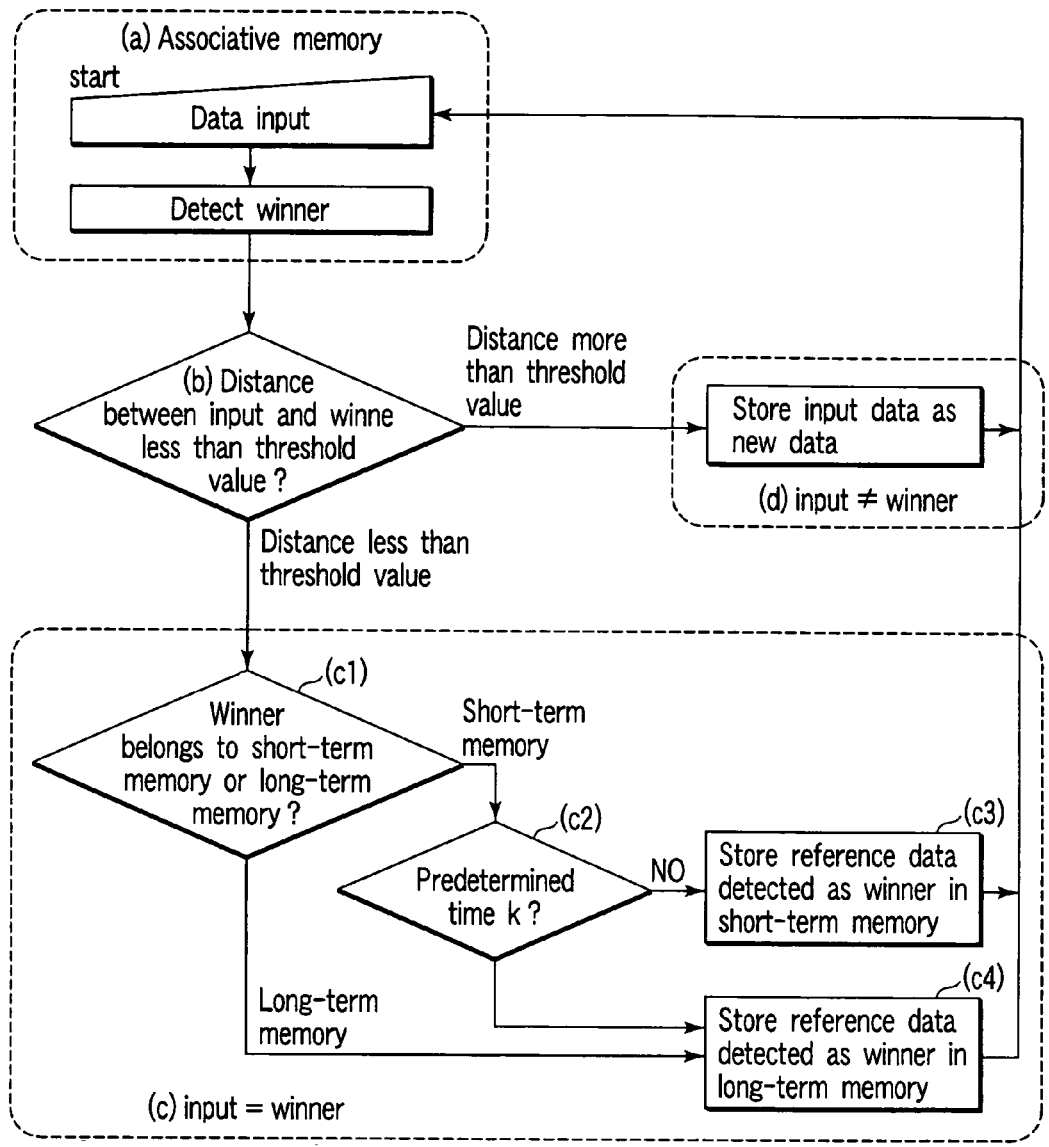
FIG. 7 is a flowchart to explain the procedure of a recognition learning algorithm 2 according to the present invention.

FIG. 7 is a flowchart to explain the procedure of a recognition learning algorithm 2 according to the present invention. In FIG. 7, the same reference numerals are used to designate portions identical to FIG. 4, and duplicate explanation is omitted.

According to the recognition learning algorithm 2, a process (c) includes the following procedures (c1) to (c4). More specifically, it is determined whether winner is long-term or short-term memory (c1). If it is determined that winner is short-term memory, it is determined whether or not the number of times of determining the winner as short-term memory reaches a predetermined time k (c2). If the number of time does not reach the predetermined time k, the winner is treated as short-term memory (c3). If the number of times reaches the predetermined time k, the winner is stored in an arbitrary rank as long-term memory.

In other words, the recognition learning algorithm 2 has the features given below. Recognitions (search data=winner) of the predetermined time k are required in the short-term memory to make a shift from the short-term memory determined as short-term memory to the long-term memory. When the k-time recognitions are made, the winner is shifted from the short-term memory to an arbitrary rank of the long-term memory. According to the foregoing recognition learning algorithm 1, the rank of the winner is improved by $J_L$ or $J_S$. Conversely, according to the recognition learning algorithm 2, when the recognition is less than k-time, the rank is shifted to the uppermost position of the memory area of the winner. Thus, data stored in the long-term memory is hard to be forgotten as compared with the short-term memory, like the foregoing recognition learning algorithm 1.

FIG. 8A to FIG. 8D each show the procedure of the recognition learning algorithm 2. Incidentally, the relationship between rank and reference data is the same as FIG. 5.

Figure 8A:
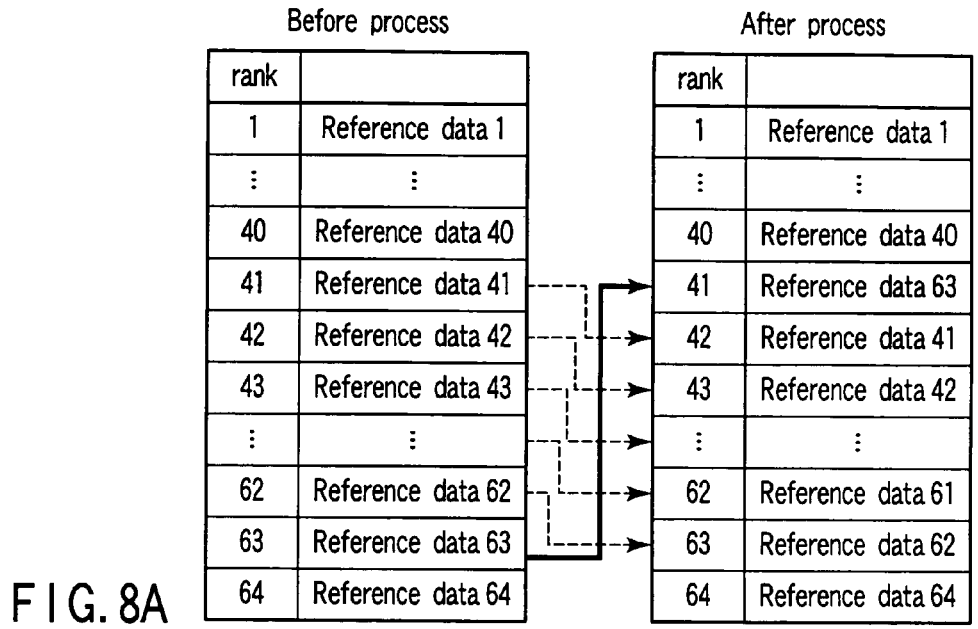

FIG. 8A shows the case where the distance D between input (search) data and winner is less than the threshold value; therefore, the input (search) data is regarded as winner. In this case, the winner is reference data 63, and belongs to the short-term memory. Thus, the rank of the winner is improved to the uppermost position (i.e., rank 41) of the short-term memory. As a result, the rank of reference data of old ranks 41 to 62 is successively put back.

Figure 8B:
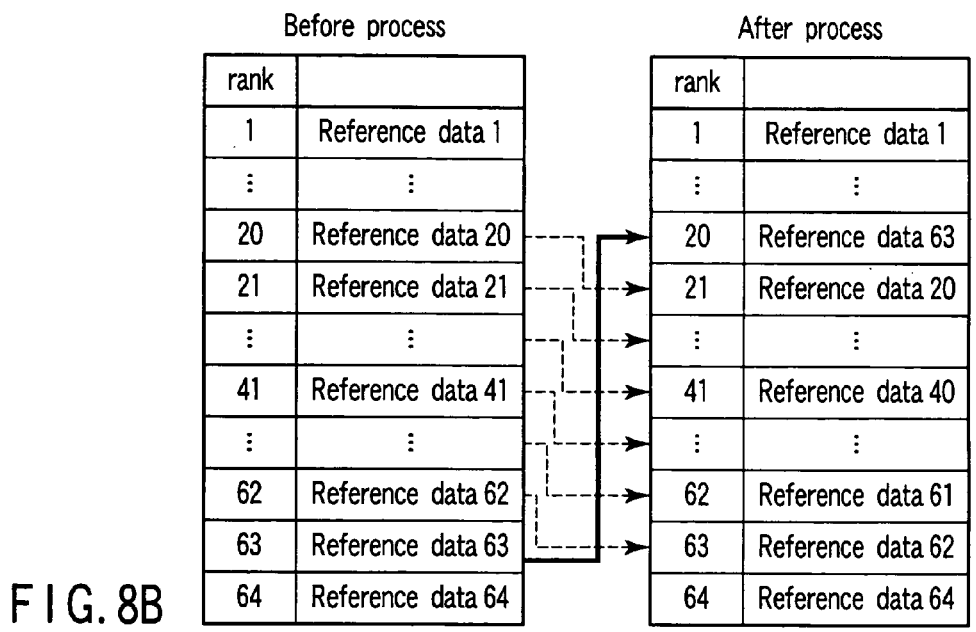

FIG. 8B shows the case where input (search) data is regarded as winner with respect to a reference data, and an operation of improving the rank to the uppermost position of the short-term memory is made by the predetermined time (k time). In this case, the reference data is shifted from the short-term memory to a rank (i.e., rank 20) preset in the long-term memory. At the same time, the rank of reference data of old ranks 20 to 62 is successively put back.

FIG. 8C shows the case where input (search) data is regarded as winner with respect to a reference data, and the winner belongs to the long-term memory. In this case, the winner is reference data 39, and belongs to the long-term memory. Thus, the rank of the winner is improved to the uppermost position (i.e., rank 1) of the long-term memory. As a result, the rank of reference data of old ranks 1 to 38 is successively put back.

FIG. 8D shows the case where the distance D between input (search) data and winner is more than the threshold value; therefore, the input (search) data is not regarded as winner. In this case, the search data is stored in the uppermost position (i.e., rank 41) of the rank of the short-term memory. On the other hand, the reference data of the lowermost position (i.e., rank 64) before process is deleted.

(Recognition Learning Algorithm 3)

Figure 9:
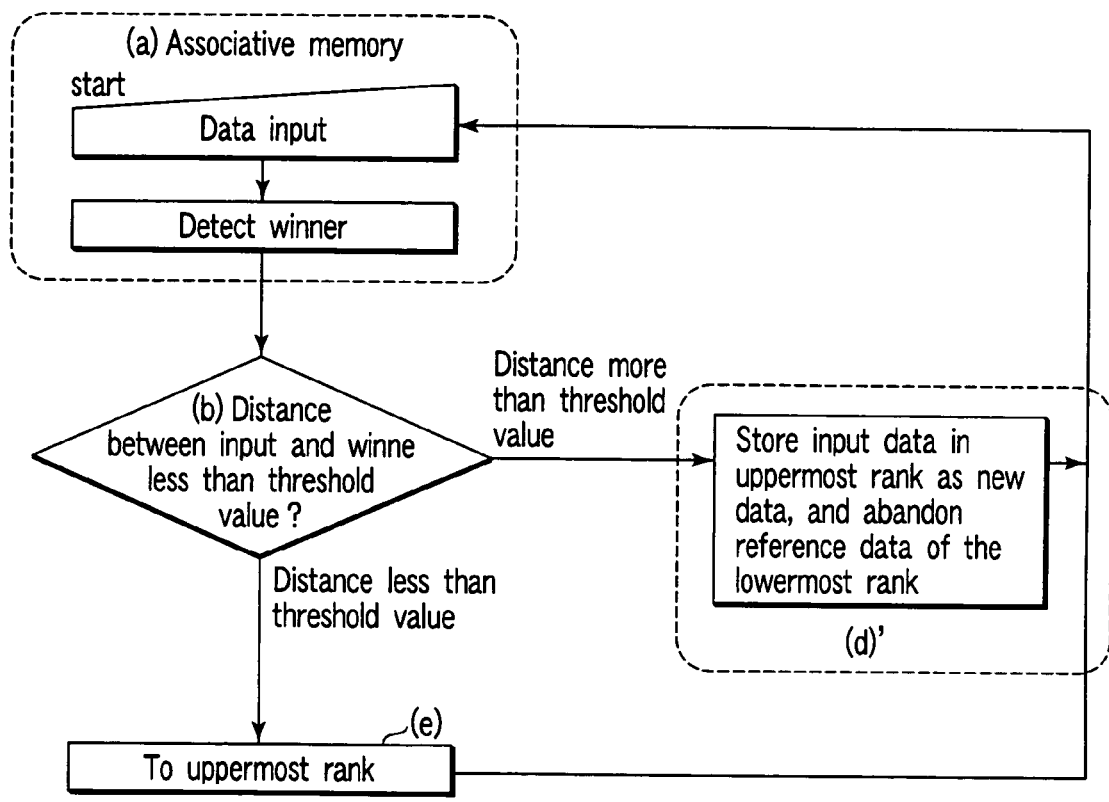
FIG. 9 is a flowchart to explain the procedure of a recognition learning algorithm 3 according to the present invention.

FIG. 9 is a flowchart to explain the procedure of a recognition learning algorithm 3 according to the present invention. In FIG. 9, the same reference numerals are used to designate portions identical to FIG. 4, and duplicate explanation is omitted.

The recognition learning algorithm 3 has the features given below. More specifically, the rank is not divided into short-term and long-term memories (no step corresponding to the process (c) of FIG. 4). In a process (d), when learning new data (input≠winner), the new data is stored in the address of data of the lowermost position, and the rank of the data is improved to the uppermost position. In this case, the rank of other data is reduced one by one. In recognition (input=winner), the winner is shifted to the uppermost position of the rank while the rank of data existing between these ranks is reduced one by one. Under the circumstance that new data frequently appears, all reference data are immediately rewritten.

Figure 10A:
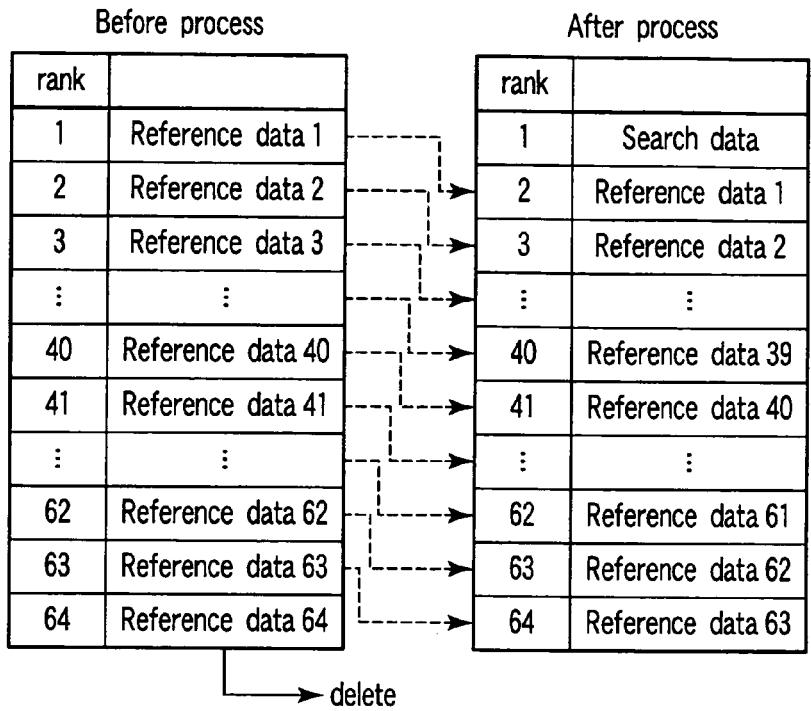
FIGS. 10A and 10B are views showing a state of ranking according to the recognition learning algorithm 3 shown in FIG. 9.
Figure 10B:
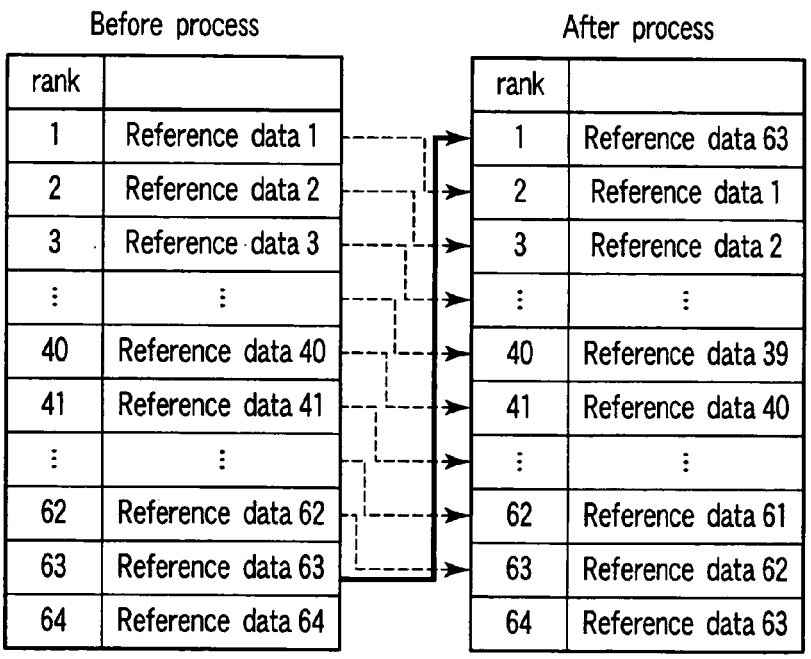

FIG. 10A to FIG. 10B each show the procedure of the recognition learning algorithm 3. Incidentally, the relationship between rank and reference data is the same as FIG. 5.

FIG. 10A shows the case where the distance D between input (search) data and winner is more than the threshold value; therefore, the input (search) data is not regarded as winner. In this case, according to the recognition learning algorithm 3, the input (search) data is stored as rank 1 while the reference data 64 of the lowermost rank is deleted (process (d)').

FIG. 10B shows the case where the distance D between input (search) data and winner is less than the threshold value; therefore, the input (search) data is regarded as winner (=reference data 63). In this case, according to the recognition learning algorithm 3, the reference data 63 regarded as winner is improved to the rank 1 regardless of the rank of the winner. On the other hand, the rank of each reference data existing from old rank 1 to 63 (rank 1 stores winner data) before process is reduced one by one (process (e)).

Figure 11:
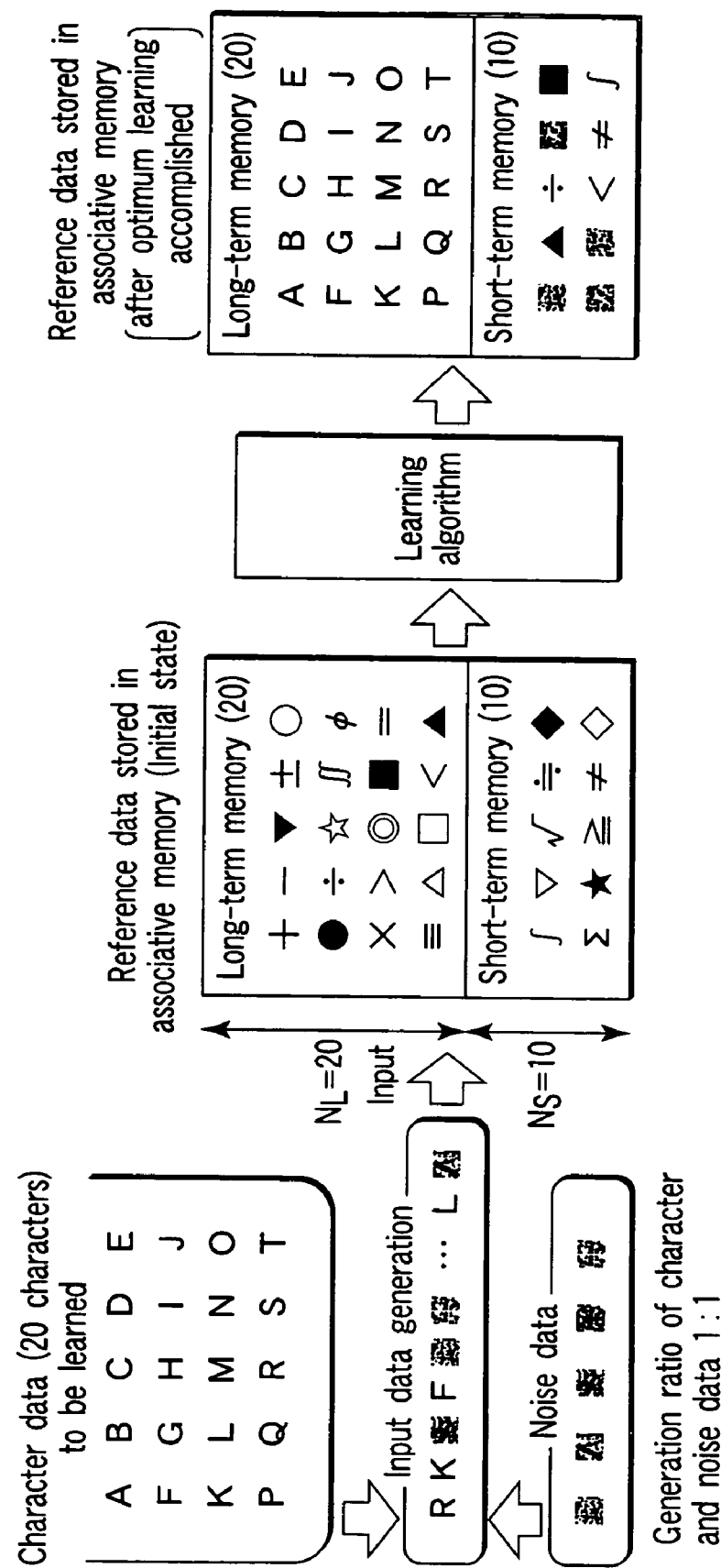
FIG. 11 is a view showing simulation evaluation for verifying the efficiency of the recognition learning algorithms 1 to 3.

In order to verify the validity of the foregoing recognition learning algorithms 1 to 3, simulation by the C programming language is prepared, and thereafter, an operation level simulation shown in FIG. 11 has been made. Prepared is an associative memory, which is capable of storing 30 patterns each having 256-bit reference data. As illustrated in FIG. 11, the associative memory previously stores 30 kinds of character bitmap data as reference data. Of 30 reference data, upper ranks 20 ($N_L$) are set as long-term memory while the remaining ranks 10 ($N_S$) are set as short-term memory.

In the foregoing algorithms 1 to 3, various parameters are given. According to the algorithm 1, the rank improvement width $J_L$=in recognition is set to 5 when winner=long-term memory while the rank improvement width $J_S$ is set to 3 when winner=short-term memory. According to the algorithm 2, the k-time recognitions required for the shift from short-term memory to long-term memory is set to 2, and the rank change in the shift is set to 14. According to the algorithm 2, search data, which does not exist in reference data, is stored as rank 1. The following bitmap data (noise pattern) is input to the associative memory. In the bitmap data (noise pattern), 20 kinds of bitmap data of new alphabets, which do not exist in reference data are used as input data, and each bit of 256 bits is set to "1" or "0" at random. Recognition learning is carried out, and thereafter, it is verified whether or not 20 alphabets are finally learned.

Figure 12A:
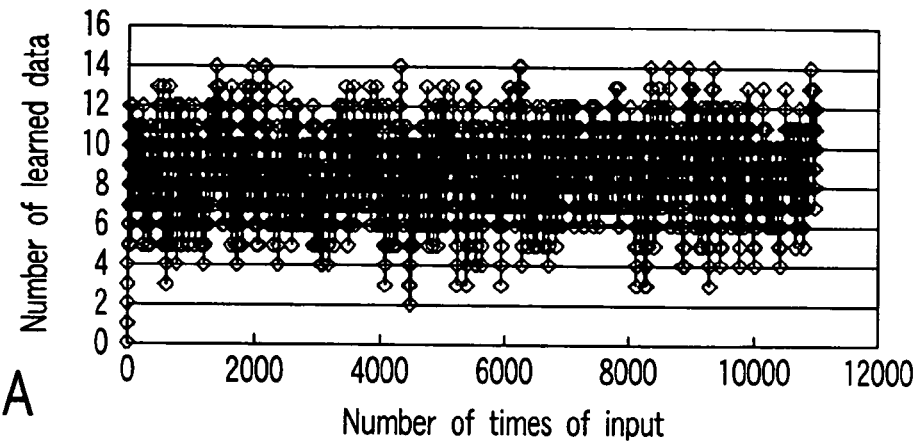
FIGS. 12A, 12B and 12C are graphs showing the foregoing simulation result, that is, the relationship between number of learning patterns and learning speed in learning algorithms 1 to 3, respectively.
Figure 12B:
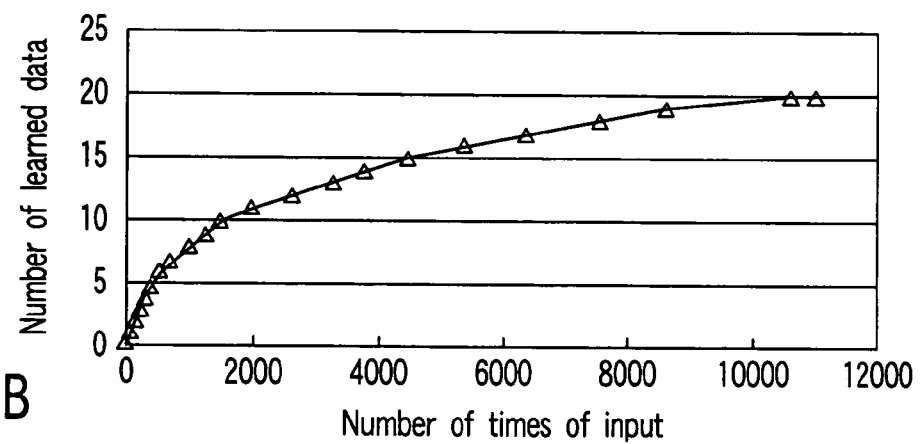
Figure 12C:
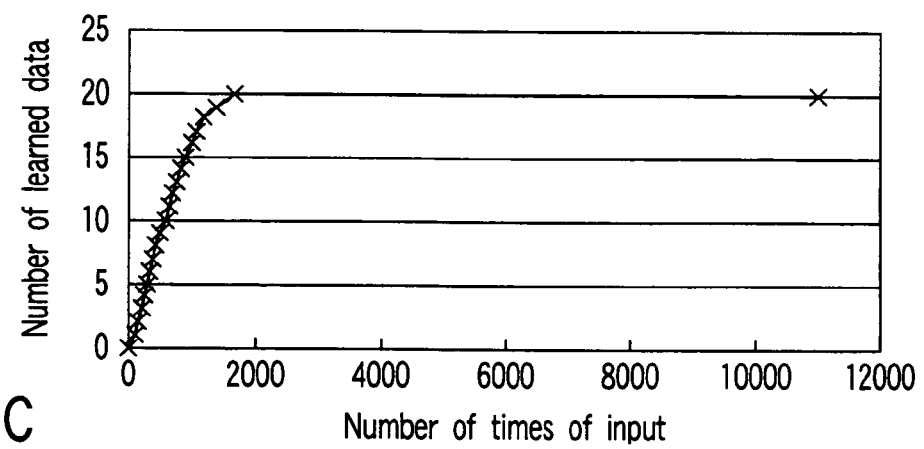

In this case, input data is generated in the following manner. First, it is determined whether given data is character data or noise data. If the given data is character data, the character data is selected from 20 alphabets. When noise data is selected, noise data is input after being generated at random. The select probability of character data and noise data is the same. In this manner, input data is given according to the forgoing method. FIG. 12A to FIG. 12C show the simulation result of the number of new alphabets data learned as long-term memory (upper rank 20 reference data) and the number of times of searches required for the foregoing learning.

FIG. 12A shows the case of the algorithm 3. According to the algorithm 3, the noise pattern is learned as rank 1. As a result, the influence of new data: noise data=1:1 is intactly given.

FIG. 12B shows the case of the algorithm 2. According to the algorithm 2, when the number of learned data increase (learning data decreases), time spent for learning becomes much. However, all new data are finally learned.

FIG. 12C shows the case of the algorithm 1. According to the algorithm 1, data is learned as short-term memory like the algorithm 2; for this reason, the noise pattern is not stored in the long-term memory. All new data are learned quickly as compared with the algorithm 2 resulting from the difference of the shift condition to the long-term memory.

Consequently, according to the algorithm 3, search data, which does not exist in reference data, is stored in the rank 1. When the initial reference data is deleted so that the search data pushes it out of the upper rank (including noise data), new data and noise data are stored in the reference data at the ratio of 1:1.

The algorithms 1 and 2 differ from the algorithm 3 in that they have a distinction between short-term and long-term memories. The input data is first stored in the short-term memory, and thereafter, is shifted to the long-term memory via matching with the search data in the short-term memory. Thus, unmatching data such as noise pattern is not stored in the long-term memory. Therefore, only new data is learned as ranks 1 to 20. In other words, the reference data is not deleted from the long-term memory by the influence of noise data.

FIG. 13 is a block diagram to explain the configuration of architecture for realizing the associative-memory-based recognition learning algorithm. The architecture is composed of three blocks, that is, associative memory 100 for making the minimum distance search, ranking processor circuit 200 and automatic learning control circuit 300.

The following memory is usable as the minimum distance associative memory 100. It is a fully parallel minimum Hamming-Manhattan distance search associative memory based on a digital/analog-combined circuit developed so far by the inventors (see Documents 1 to 3). According to the architecture, the distance D between input data and winner is required. For this reason, the foregoing associative memory is additionally provided which a distance calculating circuit, which digitally calculates the distance D.

The ranking processor circuit 200 stores the address in the associative memory which corresponds to the reference data, and makes the rank procedure for realizing short-term memory and long-term memory described in FIG. 3 to FIG. 5. The ranking processor circuit 200 has a configuration shown in FIG. 14A and FIG. 14B.

FIG. 14A shows the configuration of the ranking processor circuit for processing 64 reference data. The ranking processor circuit is formed in a manner that several rank modules make multi-stage connection. The rank module is composed of D flip-flops (DFFs) and a tri-state buffer (TBUF) for determining input-output of the DDF. In this case, 64 DFFs are arrayed vertically (in the column direction) while six DFFs are arrayed horizontally (in the row direction) correspondingly to 64 reference data. The input-output of each DFF is connected with the tri-state buffer.

The DFF of each row stores reference data address (6 bits) on the associative memory 100, and rank 1 to 64 is given to DFF successively from above. The tri-state buffer has three kinds:

(1) (TBUF-A) connecting the output of the DFF to a line connected to a bus;

(2) (TBUF-B) using the bus as input, and outputting a signal to the input of the DFF; and (3) (TBUF-C) connecting the output of the DFF to input of the next DFF.

The TBUF-A and TBUF-B make an address path of reference data when improving the rank; on the other hand, the TBUF-C makes a data path for putting back the rank. For example, in order to realize the operation described in FIG. 6B, control signals a[63], b[60], c[60], c[61] and c[62] are turned to on state to control TBUF, and thereby, clock signals ck[60] to ck[63] of DFF are input, as depicted in FIG. 14B. By doing so, the data flow shown by the arrow of FIG. 14B is realized.

The ranking processor circuit 200 makes the operation described above. The automatic learning control circuit 300 searches a DFF matching row among all DFF rows matching with the search result (winner address) from the associative memory 100. Then, the control circuit 300 obtains the rank of winner to control rank setup of the ranking-processor circuit 200. In this case, a fully matching circuit 120 of the architecture detailedly shown in FIG. 15 obtains the rank of winner (the rank of winner is found by searching a row matching the address of reference data stored in ranking process with winner address). The fully matching circuit 120 is included as one part in the automatic learning control circuit in the architecture largely divided into three blocks. Incidentally, values such as $J_L$ or $J_S$ of algorithm and the number of long-term and short-term memories are arbitrarily set.

The automatic learning control circuit 300 controls associative memory 100 and ranking processor circuit 200. The control circuit 300 generates control signals for the ranking processor circuit 200 from the search result of the associative memory 100 in accordance with the distance D between input data and winner. If the distance D is more than the threshold value (new learning case of FIG. 6C), the control circuit 300 controls the associative memory 100 in addition to the control of the ranking processor circuit 200. In this case, the control circuit 300 makes the control so that the associative memory 100 writes input data to the reference data of the lowermost rank.

As described above, the automatic learning control circuit 300 controls associative memory 100 and ranking processor circuit 200 based on the given information. The information is parameters $J_L$, $J_S$ of algorithm, threshold value, the number of the short-term memories in reference data, search result from the associative memory 100 and distance between search data and winner.

Figure 15:
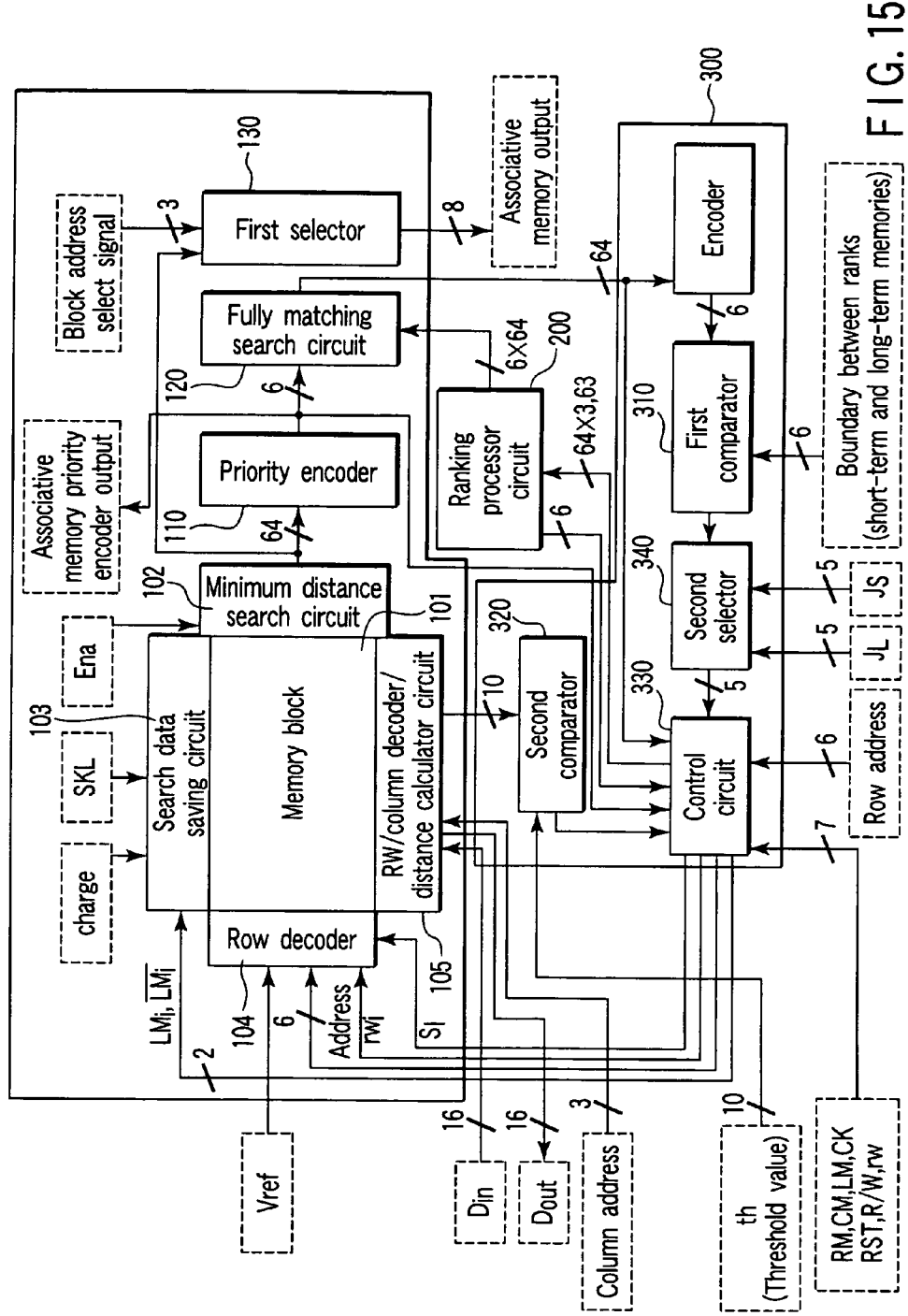
FIG. 15 is a block diagram showing the detailed architecture of a test chip prepared as one sample.

FIG. 15 shows the detailed architecture of an actually prepared test chip. The associative memory block 100 includes memory block 101, minimum distance search circuit 102, search data saving circuit 103, row decoder 104 and RW/column decoder/distance calculator circuit 105. The internal memory block 101 comprising SRAM stores reference data, and data for minimum distance search is input to the search data saving circuit 103. The associative memory has a built-in circuit 105 for directly calculating a distance between input data and specified data of the memory block. The circuit 105 is used for calculating the distance D given in algorithm.

The associative memory 100 is additionally provided with a priority encoder 110. The priority encoder carries out priority encoding for selecting one if winner are several, and outputs 6-bit winner address.

The ranking processor circuit 200 is a circuit described in FIG. 14A and FIG. 14B, and caries out the rank operation of reference data, which is the kernel of automatic recognition learning algorithm.

The fully matching search circuit 120 searches fully matching of winner address of the output of the priority encoder 110 with address of each reference data of the ranking processor circuit 200 to obtain the rank of winner. A first comparator 310 compares the rank of winner with the rank of the boundary between short-term and long-term memories given as external parameters, and thereafter, determines whether the winner belongs to short-term memory or long-term memory. A second comparator 320 sends the comparative result of the distance D calculated by the distance calculating circuit 105 with the threshold value (th) given externally to a control circuit 330. A first selector 130 divides 64 outputs from the associative memory 100 into eight parts, and thereafter, outputs them from a chip. A second selector 340 determines whether the improvement width in recognition should be set to $J_L$ or $J_S$, based on the output result of the first comparator 310.

The control circuit 330 controls associative block 100 and ranking processor circuit 200 in accordance with the following various operation modes. One is a memory mode (RM), which is a normal memory mode for reading and writing data to the memory block. Another is a CAM mode (CM) for making the minimum distance search. Another is a learning mode (LM) operating in accordance with the result of the minimum distance search.

The test chip having the foregoing architecture configuration was prepared using 0.35-μm CMOS technology under the condition of three-layer interconnection, 4.9-mm square and power supply voltage of 3.3 V. A 5-bit×16-unit Manhattan distance search associative memory capable of processing 64 reference data was designed as the associative memory block based on full custom design. The automatic learning control circuit and the ranking processor circuit were formed in the following manner. More specifically, design/simulation was made based on register transfer level (RTL) description by hardware description language Verilog-HDL. Logic synthesis was made using automatic logic synthesis tool having standard cell library at clock frequency of 20 MHz. The entire layout having built-in associative memory macro was prepared using an automatic placement and routing tool.

Figure 16:
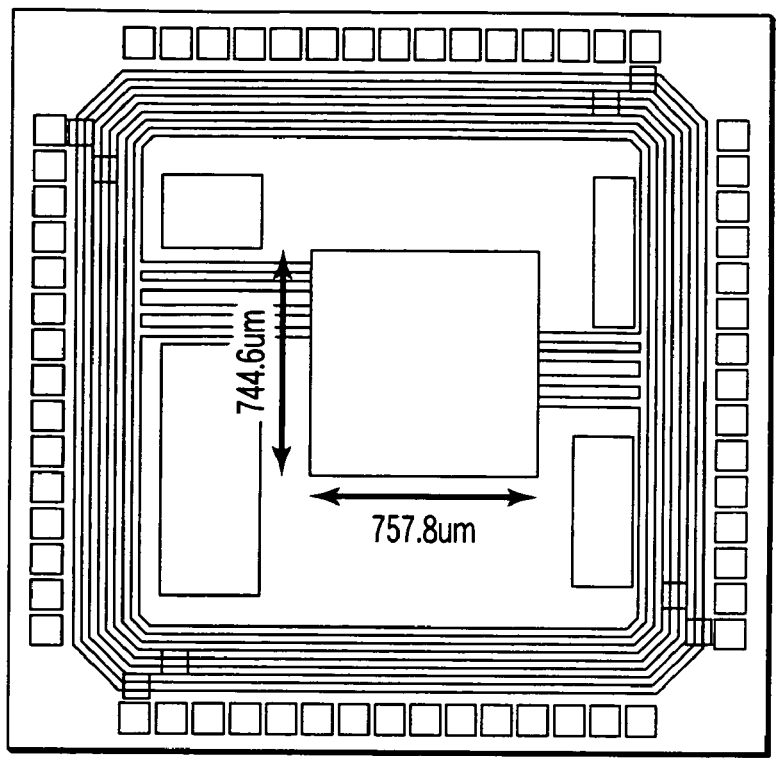
FIG. 16 is a view showing a test chip including only automatic learning control circuit and ranking circuit shown in FIG. 15.
Figure 17:
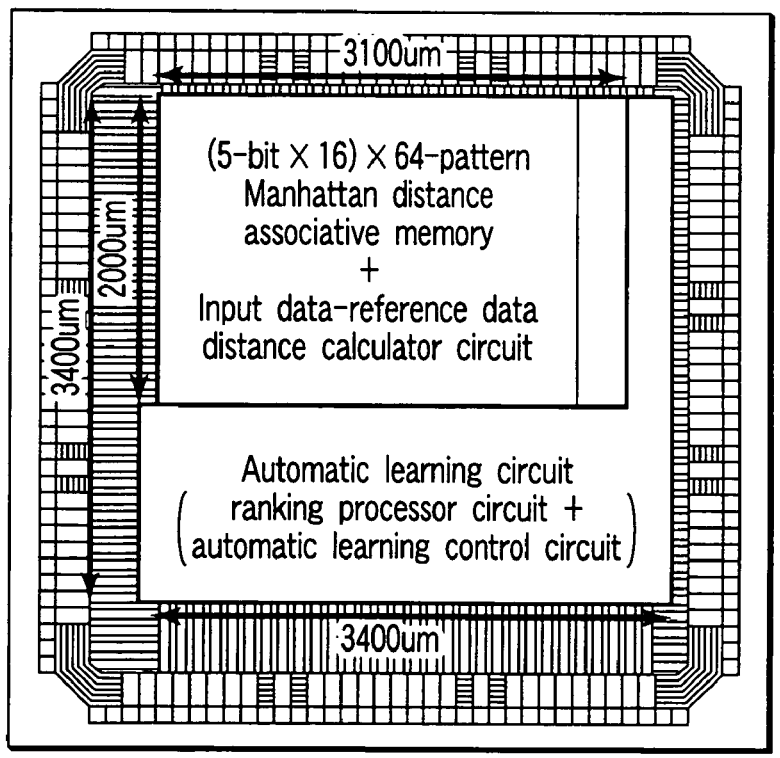
FIG. 17 is a view showing the layout of a test chip in which circuits shown in FIG. 15 are all built.

FIG. 16 shows a test chip including only automatic learning control circuit and ranking processor circuit. FIG. 17 shows the layout of the test chip including all circuits shown in FIG. 15. FIG. 18 shows a list to explain various features of the test chip. The associative memory completes the minimum distance search within 250 nsec. An automatic learning circuit operates at the maximum operation frequency 166 MHz (gate level simulation). The automatic learning circuit receives the minimum distance search result from the associative memory and data of the distance D between input data and winner to generate a signal for ranking process at one clock. When learning input data, the automatic learning circuit generates a signal for data update to the associative memory.

The chip prepared in the forgoing manner was used, and thereby, the simulation test was made; as a result, desired automatic learning was realized. Therefore, the associative-memory-based recognition learning algorithm of the present invention is employed, and thereby, it is possible to realize an integrated circuit with automatic learning function. However, realizing the automatic learning function is impossible to conventional recognition learning system by processor or neural network. In future, it is expected that pattern recognition learning is obtained within several hundreds of nsec per pattern.

According to the embodiment, the rank is divided into two hierarchies, and managed based on long-term memory and short-term memory. The present invention is not limited to the foregoing embodiment. For example, the number of ranks is arbitrarily given, and the rank is divided into three or more memory hierarchies in the order of priority. In the initial registration, the rank is set to a predetermined rank of the memory hierarchy of the short-term memory. When "identity" is obtained by identity determination, the rank is improved in the same memory hierarchy. If a predetermined condition is satisfied, the rank is registered to the upper memory hierarchy of the long-term memory. Of course, in the foregoing multi-hierarchy structure, improvement between memory hierarchies is carried out only when the foregoing "identity" by identity determination is obtained by the predetermined time, like two-hierarchy structure.

The present invention is applicable to artificial intelligence system, autonomous robots, authentication systems, intrusion detection systems (IDSs), pattern recognition system, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reference data recognition and learning method of reference data recognition and learning with respect to an associative memory, which compares input search data with several reference data to select and output the most similar reference data, comprising:

giving a rank corresponding to a priority to each of the several reference data stored in the associative memory;

comparing the search data with the several reference data when the search data is input to detect a similarity between the search data and each of the several reference data, and selecting reference data having the highest similarity; and determining whether or not the search data and the reference data selected by the comparing are identical to each other from their similarity, wherein the giving the rank includes controlling the rank such that a rank of the reference data selected by the comparing is improved by a predetermined number while a rank of other reference data equal to or lower than the improved rank is reduced when the search data and the reference data selected by the comparing are determined to be identical in the determining, and when the rank is controlled, a long-term memory hierarchy and a short-term memory hierarchy, each including an arbitrary number of ranks are formed, and when the search data and the reference data selected by the comparing are determined not to be identical in the determining, the search data are registered to an uppermost rank of the short-term memory hierarchy as new reference data, and when the search data are determined to be identical to the reference data in the short-term memory hierarchy, the registration of the search data is shifted to a predetermined rank of the long-term memory hierarchy and thereafter the rank of the reference data in the long-term memory hierarchy determined to be identical to the search data in the determining is increased by the predetermined number.

2. The method according to claim 1, wherein in the determining, the similarity between the search data and the reference data selected by the comparing is expressed by a distance, and a minimum distance between the search data and the reference data selected by the comparing is calculated, and the determining determines that the search data and the most similar reference data are identical if the minimum distance is within a predetermined threshold and otherwise determines that they are not identical.

3. The method according to claim 1, wherein in the controlling of the rank, reference data of the lowest rank are abandoned when registering the search data as the new reference data.

4. The method according to claim 1, wherein in the controlling of the rank, when the search data and the reference data selected by the comparing are determined to be identical, an amount of improvement when improving a rank in a same memory hierarchy is larger in the long-term memory hierarchy than in the short-term memory hierarchy.

5. A pattern recognition system for selecting reference data, which is the most similar to search data of an input pattern, from several reference data to recognize the input pattern, comprising:

an associative memory including reference data memory means for storing the several reference data for recognizing the search data of the input pattern;

minimum distance search means for expressing a degree of similarity by distance and searching for the reference data having the minimum distance with respect to the search data from said several reference data; and identity determining means for determining the identity of the search data and the reference data having the minimum distance in accordance with whether or not the minimum distance is more than a threshold value;

rank control means for managing the several reference data stored in the associative memory to give a rank corresponding to the priority to each of the several reference data; and recognition learning control means for controlling the rank control means so that the rank control means improves a rank of the reference data while reducing a rank of other reference data equal to or lower than the improved rank when the identity determining means determines that the search data and the reference data are identical, wherein the recognition learning control means forms a long-term memory hierarchy and a short-term memory hierarchy, each having an arbitrary number of ranks, when the search data and the reference data are determined not to be identical by the identity determining means, the recognition learning control means registers the search data to an uppermost rank of the short-term memory hierarchy as new reference data, when the search data are determined to be identical to the reference data in the short-term memory hierarchy, the recognition learning control means shifts the registration of the search data to a predetermined rank of the long-term memory hierarchy and improves, thereafter, the rank of the reference data in the long-term memory hierarchy determined to be identical to the search data by the identity determining means by a predetermined number.

6. The system according to claim 5, wherein the minimum distance search means searches for either Hamming distance, Manhattan distance or Euclidian distance as the distance between the search data and the reference data.

7. The system according to claim 5, wherein the rank control means manages the rank of the reference data stored in the associative memory based on their address value.

8. The system according to claim 5, wherein the rank control means carries out rank improvement between the memory hierarchies only when the search data is determined to be identical to the reference data by a predetermined number of times in the identity determining means.

9. The system according to claim 5, wherein the associative memory, the rank control means and the recognition learning control means are built in an integrated circuit.

10. A pattern recognition system for selecting reference data, which is the most similar to search data of an input pattern, from several reference data to recognize the input pattern, comprising:

an associative memory including
a reference data memory configured to store the several reference data for recognizing the search data of the input pattern;
a minimum distance search circuit configured to express a degree of similarity by distance and to search for the reference data having the minimum distance with respect to the search data from said several reference data; and
an identity determining circuit configured to determine the identity of the search data and the reference data having the minimum distance in accordance with whether or not the minimum distance is more than a threshold value;
a rank control circuit configured to manage the several reference data stored in the associative memory to give a rank corresponding to the priority to each of the several reference data; and
a recognition learning control circuit configured to control the rank control circuit so that the rank control circuit improves a rank of the reference data while reducing a rank of other reference data equal to or lower than the improved rank when the identity determining circuit determines that the search data and the reference data are identical, wherein the recognition learning control circuit is configured to form a long-term memory hierarchy and a short-term memory hierarchy, each having an arbitrary number of ranks, when the search data and the reference data are determined not to be identical by the identity determining circuit, the recognition learning control circuit is configured to register the search data to an uppermost rank of the short-term memory hierarchy as new reference data, when the search data are determined to be identical to the reference data in the short-term memory hierarchy, the recognition learning control circuit is configured to shift the registration of the search data to a predetermined rank of the long-term memory hierarchy and to improve, thereafter, the rank of the reference data in the long-term memory hierarchy determined to be identical to the search data by the identity determining circuit by a predetermined number.

* * * * *